US005674613A

United States Patent [19]

Dharmarajan et al.

[11] Patent Number: 5,674,613

[45] Date of Patent: Oct. 7, 1997

[54] ELECTRICAL DEVICES INCLUDING ETHYLENE, A-OLEFIN, VINYL NORBORNENE ELASTOMERIC POLYMERS

[75] Inventors: Narayanaswami Raja Dharmarajan, Houston; Periagaram S. Ravishankar, Kingwood, both of Tex.

[73] Assignee: Exxon Chemical Patents Inc., Houston, Tex.

[21] Appl. No.: 490,503

[22] Filed: Jun. 14, 1995

[51] Int. Cl.[6] .............................. B32B 27/28; H01B 3/30

[52] U.S. Cl. .......................... 428/378; 428/375; 428/461; 428/462; 428/500; 428/521; 526/282; 526/916; 174/110 SR; 174/110 AR

[58] Field of Search .................................. 428/375, 378, 428/461, 462, 500, 521; 526/282, 916; 174/110 SR, 110 AR

[56] References Cited

U.S. PATENT DOCUMENTS

| | | | |
|---|---|---|---|
| 3,674,754 | 7/1972 | Cameli et al. . | |
| 4,510,303 | 4/1985 | Oda et al. | 526/282 |
| 4,588,794 | 5/1986 | Oda et al. | 526/169.2 |
| 4,599,391 | 7/1986 | Yamamoto et al. | 526/282 |
| 4,764,562 | 8/1988 | Tojo et al. | 525/281 |
| 5,246,783 | 9/1993 | Spenadel et al. | 428/461 |

FOREIGN PATENT DOCUMENTS

| | | |
|---|---|---|
| 0 150 610 A2 | 8/1985 | European Pat. Off. . |
| 63-8408 | 1/1988 | Japan . |
| 64-54010 | 3/1989 | Japan . |

*Primary Examiner*—Patrick Ryan
*Assistant Examiner*—Marie R. Yamnitzky
*Attorney, Agent, or Firm*—Douglas W. Miller

[57] ABSTRACT

Elastomeric polymers including ethylene, alpha-olefin and vinyl norbornene are shown to have improved extrusion characteristics, improved electrical properties, improved cure characteristics compared to ethylene, alpha-olefin, non-conjugated diene elastomeric polymers containing non-conjugated dienes other than vinyl norbornene. The elastomeric polymers containing vinyl norbornene generally have a branching index below 0.5.

9 Claims, 4 Drawing Sheets

ELECTRICAL DEVICES INCLUDING ETHYLENE, A-OLEFIN, VINYL NORBORNENE ELASTOMERIC POLYMERS

TECHNICAL FIELD

This invention relates to electrically conductive or semi-conductive devices. In another aspect this invention relates to the electrically conductive or semi-conductive devices including ethylene, α-olefin, vinyl norbornene elastomeric polymers. In yet another aspect the invention relates to electrically conductive or semi-conductive devices having a member including an ethylene, α-olefin, vinyl norbornene elastomeric polymer having a branching index of less than about 0.5 and the compounds made from the elastomeric polymer providing elastomeric polymer based members having excellent surface characteristics and dielectric strength.

BACKGROUND

Typical power cables generally include one or more conductors in a core that is generally surrounded by several layers that can include a first polymeric semi-conducting shield layer, a polymeric insulating layer and a second polymeric semi-conducting shield layer, a metallic tape and a polymeric jacket. A wide variety of polymeric materials have been utilized as electrical insulating and semi-conducting shield materials for power cable and numerous other electrical applications.

Power cable and other electrical devices often must have extremely long life, for among many other reasons including that to replace them means inconvenience and/or substantial expense. In order to be utilized in such products where long term performance is desired or required, such polymeric materials in addition to having suitable dielectric properties must also be resistant to substantial degradation and must substantially retain their functional properties for effective and safe performance over many years of service. For example, polymeric insulation used in building wire, electric motor wires, machinery power wires, underground power transmitting cables, or the like, should have long service life not only for safety, but also out of economic necessity and practicality.

In elastomer or elastomer-like polymers often used as one or more of the polymer members in power cables, common ethylene, α-olefin, non-conjugated diene elastic polymers materials that have come into wide use usually include ethylene, α-olefin, and a non-conjugated diene selected from the group consisting of 5-ethylidene-2-norbornene (ENB), 1,4-hexadiene, 1,6 octadiene, 5-methyl-1,4 hexadiene, 3,7-dimethyl-1,6-octadiene, and the like. Such polymers can provide a good insulating property for power cables. However, ethylene, alpha-olefin, non-conjugated diene elastomeric polymers, which incorporate these dienes have typically low levels of long chain branching. Consequently electrical compounds containing these polymers usually necessitate slower extrusion rates than might be desirable, because surface characteristics of the extrudate in a compound based on these elastomeric polymers will not be as smooth as desired if the extrusion rates are higher. Generally, if a manufacturer would like to increase their production rate by increasing extruder output, such relatively low levels of long chain branching in the ethylene, α-olefin, non-conjugated diene elastomeric polymers discussed above, surface roughness due to melt fracture is likely to occur.

Electrical insulation applications are generally divided into low voltage insulation, which are those applications generally less than 1K volts, medium voltage insulation applications which generally range from 1K volts to 35K volts, and high voltage insulation applications generally above 35K volts. For medium voltage applications common polymeric insulators are made from polyethylene homopolymer compounds or ethylene propylene (otherwise known as EP or EPDM) elastomeric compounds.

In the manufacture of electrical conducting devices, as in other manufacturing applications, manufacturers will often seek to improve economics while maintaining or improving quality. However, several limitations do or may exist with the current ethylene, α-olefin, non-conjugated diene elastomeric polymer based compounds. For instance, with certain of these polymers, a faster extruder speed may cause surface roughness on one or more of the polymeric layers. Such roughness is generally undesirable. Additionally, even if a given polymer or polymers could be extruded faster, the manufacturer's downstream equipment, such as a continuous vulcanization equipment may be unable to keep up with the faster pace, as often the curing mechanism is generally time and or temperature dependent. Decrease in temperature or time may result in insufficient cure and potentially lower quality product.

There is a commercial need for an elastomeric polymer insulating material for electrical devices that can be extruded relatively rapidly, in the substantial absence of surface roughness, having a relatively rapid cure rate, relatively high cure state and relatively low electrical loss. There is also a need for improved long term heat aging and lower cure additives consumption, all of which may reduce the overall manufacturing cost of the cable insulation and/or improve quality.

SUMMARY

We have discovered that polymeric insulation for electrically conducting devices, when it includes an ethylene, alpha-olefin, vinyl norbornene elastomeric polymer with a relatively low branching index, indicative of long chain branching, will provide a smooth surface at relatively high extruder speeds, and generally will cure faster to a higher cure state than previously available ethylene, alpha-olefin, non-conjugated diene elastomeric polymers.

According to one embodiment of our invention, an electrically conductive device is provided including (a) an electrically conductive member comprising at least one electrically conductive substrate; and (b) at least one electrically insulating member in proximity to the electrically conductive member. In this embodiment the insulating member includes an elastomeric polymer selected from the group consisting of ethylene, polymerized with at least one α-olefin, and vinyl norbornene.

The elastomeric polymers of various embodiments of our invention may contain in the range of from about 50 to about 90 mole percent ethylene preferably about 70 to about 90 mole percent, more preferably about 75 to about 85 mole percent based on the total moles of the polymer. The elastomeric polymer contains the alpha-olefin in the range of from about 10 to about 50 mole percent, preferably in the range of from about 10 to about 30 mole percent, more preferably in the range of from about 15 to about 25. The elastomeric polymers will have a vinyl norbornene content in the range of from 0.16 to about 5 mole percent, more preferably 0.16 to about 1.5 mole percent, most preferably 0.16 to about 0.4 mole percent based on the total moles of the polymer. The elastomeric polymer will also have a Mooney viscosity (ML[1+4]125° C.) generally in the range of from about 10 to about 80, preferably in the range of from about 15 to about 60, more preferably in the range of from about 20 to about 40. Preferably the branching index of the polymer is up to about 0.5, more preferably up to about 0.4, most preferably up to about 0.3. The elastomeric polymer will have a $M_{w,GPC,LALLS}/M_{n,GPC,DRI}(M_w/M_n)$ greater than about 6, preferably greater than about 8, more preferable above about 10, most preferably above about 15.

Electrical insulating and/or semi-conducting compounds using these elastomeric polymers may be made using fillers and other constituents well known to those of ordinary skill in the art.

To attain the same cure state as commercially available ethylene, alpha-olefin, non-conjugated diene elastomeric polymers with the diene selected for example from the group consisting of 5-ethylidene-2-norbornene, 1,4-hexadiene, 1,6 octadiene, 5-methyl-1,4 hexadiene, 3,7-dimethyl-1,6-octadiene, and the like, the elastomeric polymers described in an embodiment of our invention require lower diene levels, at substantially equivalent curative levels.

Alternatively, at the same diene content as these other ethylene, alpha-olefin, non-conjugated diene elastomeric polymers, lower curative levels will be necessary to reach the same or a higher cure state. The ethylene, alpha-olefin, vinyl norbornene elastomeric polymers of certain embodiments of our invention have a branching index below about 0.5. The lower branching index permits the extruded insulating members to have a smoother surface at higher extrusion rates and a lower die swell compared to previously available commercial materials. The heat aging performance, of various embodiments of our invention at comparable levels of diene incorporation are similar to those of other diene containing elastomeric polymer compounds. However, owing to generally lower diene content, the ethylene, alpha-olefin, vinyl norbornene elastomeric polymers of certain embodiments of our invention, required to achieve the same cure state as previously available ethylene, alpha-olefin, non-conjugated diene elastomeric polymer, the compounds formulated with the elastomeric polymers of our invention generally exhibit improved heat aging performance relative to the previously available ethylene, alpha-olefin, non-conjugated diene elastomeric polymer compounds.

Increases to the molecular weight of the ethylene, alpha olefin, vinyl norbornene polymer, generally determined by Mooney viscosity, (all other polymer parameters remaining fixed) will increase tensile strengths, decrease elongation, increase cure state, lower extrusion mass rate, and provide a rougher extruded surface in the electrical insulating or semi conducting member.

Increases in ethylene content at a given Mooney viscosity and diene incorporation level, will generally increase tensile strengths and elongation in the electrical insulating or semi conducting member, but, will provide a rougher extrudate surface.

By increasing vinyl norbornene level at a given Mooney viscosity and ethylene content in the elastomeric polymer, compound tensile strength may increase toward a maximum, before falling off, elongation will decrease, cure state will generally remain level, cure rate will increase, mass extrusion rate will rise, as will surface smoothness, and a compound made from such an elastomeric polymer will require lower curative levels to achieve equivalent cure state.

Increasing the clay level in the electrical compound with all other parameters remaining fixed, will increase the tensile strength, decrease elongation, increase cure state, increase the mass extrusion rate and enhance the surface characteristics of the extruded compound.

Changing the type of clay to a more structured clay (e.g. Translink® 77 Clay) with an increased aspect ratio, and all other parameters remaining constant, will increase the tensile strength and decrease elongation in the electrical compound.

Combinations of a more and less structured clay and mixtures thereof (e.g. blends of Translink® 77 and Translink® 37), and all other parameters remaining constant, will produce an additive effect on the compound physical properties.

These and other features, aspects, and advantages of the present invention will become better understood with reference to the following description and appended claims.

BRIEF DESCRIPTION OF DRAWINGS

These and other features, aspects, and advantages of the present invention will become better understood with reference with the following description, appended claims, and accompanying drawings where:

FIG. A shows co-catalyst influence on polymer compositional distribution.

DESCRIPTION

Introduction

Figure 1:
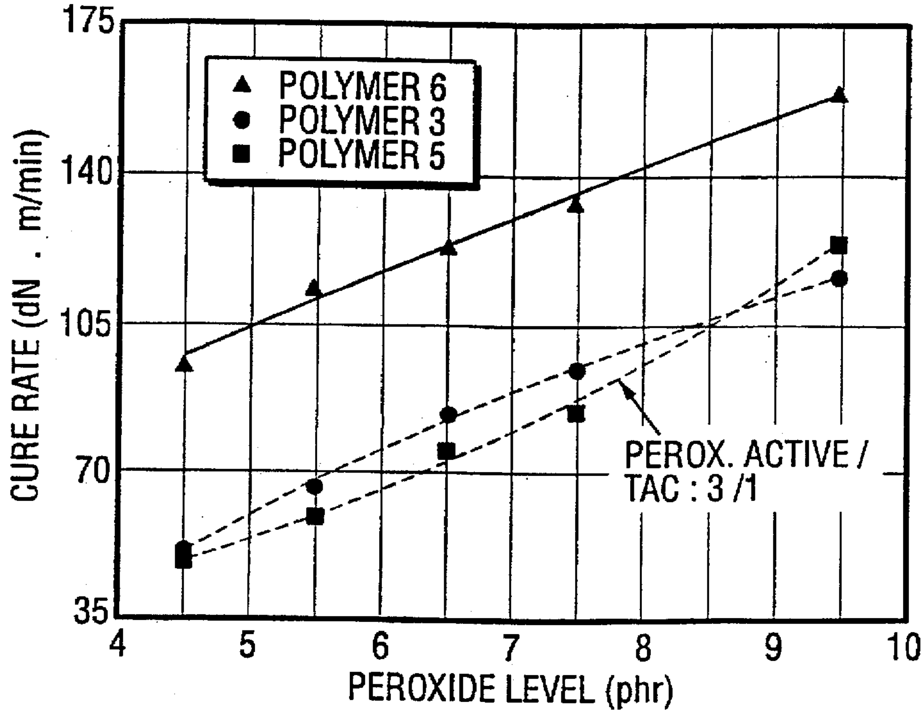
FIG. 1 shows variation in compound cure rate with peroxide level in 60 phr clay formulations.

Various embodiments of the present invention concern certain elastomeric polymer compositions, certain compound compositions and applications based on the elastomeric polymer and the compounds made therefrom. These elastomeric polymer compositions have properties when used in an electrically conducting device which make them particularly well-suited for applications that require excellent surface characteristics, faster cure rates, more complete cure state, lower amounts of curative agent, and improved dielectric properties.

Following is a detailed description of various preferred elastomeric polymer compositions within the scope of the present invention, preferred methods of producing these compositions, and preferred applications of these polymer compositions. Those skilled in the art will appreciate that numerous modifications of these preferred embodiments can be made without departing from the scope of this invention. For example, although the properties of the polymer composition are exemplified in electrical insulating applications, they will have numerous other electrical uses. To the extent our description is specific, it is solely for purpose of illustrating preferred embodiments of our invention and should not be taken as limiting the present invention to these specific embodiments.

The use of headings in the present application is intended to aid the reader, and is not intended to be limiting in any way.

Various values given in the text and claims are determined and defined as follows.

| No. | Test | Test Method | Units |
|---|---|---|---|
| 1 | Branching Index | Exxon (described here) | none |
| 2 | (elastomeric polymer composition determination) | | |
| | Ethylene | ASTM D 3900 | wt % |
| 3 | Ethylidene Norbornene | FT. — Infra Red | wt % |
| | Vinyl Norbornene | FT. — Infra Red | wt % |
| 4 | Mooney Viscosity | ASTM D 1646 - 94 | Mooney Units |
| 5 | Scorch Time | ASTM D 2084 - 93 | minutes |
| 6 | Cure Characteristics | ASTM D 2084 - 93 | |
| | $M_L$ | | dN · m |
| | $M_H$ | | dN · m |
| | $t_{s2}$ | | minutes |
| | $t_{c90}$ | | minutes |
| | Cure State = $(M_H\text{-}M_L)$ | | dN · m |
| | Cure Rate | | dN · m/min |
| 7 | 100% Modulus | ASTM D 412 - 92 | MPa |
| 8 | 300% Modulus | ASTM D 412 - 92 | MPa |
| 9 | Tensile Strength | ASTM D 412 - 92 | MPa |
| 10 | Elongation | ASTM D 412 - 92 | % |
| 11 | Heat Aging | ASTM D 572 - 88 | |
| | Tensile Change | | % |
| | Elongation Change | | % |
| 12 | Surface Roughness (R) | Surfcom ® 110B Surface gauge | µm |
| 13 | Extrusion | Haake Rheocord 90 | |
| | | Extruder Temperature = 110° C., Screw speed = 120 RPM, Extruder L/D = 20/1, Comp. Screw = 2/1, GARVY Die | |
| | Mass Rate | | g/min |
| | Screw Speed | | rpm |
| 14 | Electrical Power Loss | Dissipation Factor in water @ 90° C. 60 Hz and 600 V AC. | % |

Various physical properties of compounds based on the elastomeric polymers of certain embodiments of our invention and ranges for these properties are shown below. The properties are based on the recipe for formulation B, Table 2, containing 60 phr Translink® 37 clay and 6.5 phr peroxide. (Dicup 40 KE).

| Test Condition | Units | Broad | Narrow | Very Narrow |
|---|---|---|---|---|
| I Heat Aging, 28 days 150° C. | | | | |
| Hardness Change(1) | Points | <5 | <4 | <1 |
| Tensile Strength(2) Change | % | <70 | <60 | <20 |
| Elongation Change | % | <70 | <50 | <20 |
| II Electrical Dissipation Factor - 28 days in 90° C. water | % | >0.750 | <0.650 | <0.500 |
| III Compound Properties | | | | |
| ML (1 + 8) 100° C. | MU | <56 | <51 | <40 |
| Cure State (MH-ML) | dN.m | >75 | >85 | >110 |
| Cure Rate | dN.m | >90 | >110 | >150 |
| Tensile Strength | Mia | >8.2 | >9.2 | >13 |
| Elongation | % | >150 | >180 | >300 |

-continued

| Test Condition | Units | Broad | Narrow | Very Narrow |
|---|---|---|---|---|
| IV Extrusion Properties | | | | |
| Surface Roughness | µm | <10 | <8 | <5.5 |
| Mass Extrusion Rate | g/min | >120 | >135 | >190 |

(1) Absolute [Aged Hardness − Unaged Hardness]

(2) $\frac{\text{Absolute [Aged Value − Unaged Value]} \times 100}{\text{Unaged Value}}$ In general peroxide levels in such compounds may be described as follows:

| Test Condition | Units | Broad | Narrow | Very Narrow |
|---|---|---|---|---|
| Peroxide Level | | | | |
| Dicumyl Peroxide | (gm mole/phr) × $10^{-3}$ | 3 to 89 | 3 to 45 | 9 to 25 |

In certain embodiments of the present invention, an electrically conductive device comprises: a) an electrically conductive member including at least one electrically conductive substrate; and b) at least one electrically insulating member substantially surrounding the electrically conducting member including a polymer selected from the group consisting of ethylene polymerized with an α-olefin and a non-conjugated diene, said α-olefin is selected from the group consisting of α-olefins selected from the group consisting of propylene, butene-1, 4-methyl-1-pentene, hexene-1, octene-1, decene-1, and combinations thereof, said non-conjugated diene being vinyl norbornene, wherein said polymer has a branching index (BI) (defined below) of up to about 0.5. Preferably the BI is up to about 0.4, more preferably up to about 0.3.

The Ethylene, Alpha-Olefin, Vinyl Norbornene Elastomeric Polymer

The Ziegler polymerization of the pendent double bond in vinyl norbornene (VNB) is believed to produce a highly branched ethylene, alpha-olefin, vinyl norbornene elastomeric polymer. This method of branching permits the production of ethylene, alpha-olefin, vinyl norbornene elastomeric polymers substantially free of gel which would normally be associated with cationically branched ethylene, alpha-olefin, vinyl norbornene elastomeric polymer containing, for instance, a non-conjugated diene such as 5-ethylidene-2-norbornene, 1,4-hexadiene, and the like. The synthesis of substantially gel-free ethylene, alpha-olefin, vinyl norbornene elastomeric polymers containing vinyl norbornene is discussed in Japanese laid open patent applications JP 151758, JP 210169.

Preferred embodiments of the aforementioned documents to synthesize polymers suitable for this invention are described below:

The catalyst used are $VOCl_3$ (vanadium oxytrichloride) and $VCl_4$ (vanadium tetrachloride) with the later as the preferred catalyst. The co-catalyst is chosen from (i) ethyl aluminum sesqui chloride (SESQUI), (ii) diethyl aluminum chloride (DEAC) and (iii) equivalent mixture of diethyl aluminum chloride and triethyl aluminum (TEAL). As shown in FIG. A the choice of co-catalyst influences the compositional distribution in the polymer. The polymer with broader compositional distribution is expected to provide the best tensile strength in the dielectric cable compound. The polymerization is carded out in a continuous stirred tank reactor at 20°–65° C. at a residence time of 6–15 minutes at a pressure of 7 $kg/cm^2$. The concentration of vanadium to alkyl is from 1 to 4 to 1 to 8. About 0.3 to 1.5 kg of polymer is produced per gm of catalyst fed to the reactor. The polymer concentration in the hexane solvent is in the range of 3–7% by weight. The synthesis of ethylene, alpha-olefin, vinyl norbornene polymers were conducted both in a laboratory pilot unit (output about 4 Kg/day) and a large scale semi works unit (output 1 T/day).

A discussion of catalysts suitable for polymerizing our elastomeric polymer or other catalysts and co-catalysts contemplated are discussed in the two Japanese laid open patent applications referenced above.

The resulting polymers had the following molecular characteristics:

The intrinsic viscosity measured in decalin at 135° C. were in the range of 1–2 dl/g. The molecular weight distribution ($M_{w,LALLS}/M_{n,GRC/DRI}$) was >10. The branching index was in the range 0.1–0.3.

Metallocene catalysis of the above monomers is also contemplated including a compound capable of activating the Group 4 transition metal compound of the invention to an active catalyst state is used in the invention process to prepare the activated catalyst. Suitable activators include the ionizing noncoordinating anion precursor and alumoxane activating compounds, both well known and described in the field of metallocene catalysis.

Additionally, an active, ionic catalyst composition comprising a cation of the Group 4 transition metal compound of the invention and a noncoordinating anion result upon reaction of the Group 4 transition metal compound with the ionizing noncoordinating anion precursor. The activation reaction is suitable whether the anion precursor ionizes the metallocene, typically by abstraction of $R_1$ or $R_2$, by any methods inclusive of protonation, ammonium or carbonium salt ionization, metal cation ionization or Lewis acid ionization. The critical feature of this activation is cationization of the Group 4 transition metal compound and its ionic stabilization by a resulting compatible, noncoordinating, or weakly coordinating (included in the term noncoordinating), anion capable of displacement by the copolymerizable monomers of the invention. See, for example, EP-A-0 277,003, EP-A-0 277,004, U.S. Pat. No. 5,198,401, U.S. Pat. No. 5,241,025, U.S. Pat. No. 5,387,568, WO 91/09882, WO 92/00333, WO 93/11172 and WO 94/03506 which address the use of noncoordinating anion precursors with Group 4 transition metal catalyst compounds, their use in polymerization processes and means of supporting them to prepare heterogeneous catalysts. Activation by alumoxane compounds, typically, alkyl alumoxanes, is less well defined as to its mechanism but is none-the-less well known for use with Group 4 transition metal compound catalysts, see for example U.S. Pat. No. 5,096,867. Each of these U.S. documents are incorporated by reference for purposes of U.S. patent practice.

For peroxide cure applications, vinyl norbornene containing ethylene, alpha-olefin, diene monomer elastomeric polymers require lower levels of peroxide to attain the same cure state compared to ethylene, alpha-olefin, diene monomer with ethylidene norbornene termonomer at the same level of incorporated diene. Typically 20 to 40% lower peroxide consumption can be realized using ethylene, alpha-olefin, vinyl norbornene. The efficiency of vinyl norbornene in providing high cross link density with peroxide vulcanization also permits a reduction in the overall diene level to attain the same cure state as ethylidene norbornene polymers. This results in enhanced heat aging performance, generally owing to lower diene incorporation. This unique combinations of improved processability, lower peroxide usage and enhanced heat aging are the benefits provided by ethylene, alpha-olefin, vinyl norbornene over conventional non-conjugated dienes such as ethylidene norbornene or 1–4, hexadiene or the like including terpolymer or tetrapolymers.

The relative degree of branching in ethylene, alpha-olefin, diene monomer is determined using a branching index factor. Calculating this factor requires a series of three laboratory measurements[1] of polymer properties in solutions. These are: (i) weight average molecular weight ($M_{w,LALLS}$) measured using a low angle laser light scattering (LALLS) technique; (ii) weight average molecular weight ($M_{w,DRI}$) and viscosity average molecular weight ($M_{v,DRI}$) using a differential refractive index detector (DRI) and (iii) intrinsic viscosity (IV) measured in decalin at 135° C. The first two measurements are obtained in a GPC using a filtered dilute solution of the polymer in tri-chloro benzene.

[1]VerStrate, Gary "Ethylene-Propylene Elastomers", Encyclopedia of Polymer Science and Engineering, 6, 2nd edition, (1986)

An average branching index is defined as:

$$BI = \frac{M_{v,br} \times M_{w,DRI}}{M_{w,LALLS} \times M_{v,DRI}} \qquad (1)$$

where, $M_{v,br} = k(IV)^{1/a}$;

and 'a' is the Mark-Houwink constant (=0.759 for ethylene, alpha-olefin, diene monomer in decalin at 135° C.).

From equation (1) it follows that the branching index for a linear polymer is 1.0, and for branched polymers the extent of branching is defined relative to the linear polymer. Since at a constant $M_n$, $(Mw)_{branch} > (Mw)_{linear}$, BI for a branched polymers is less than 1.0, and a smaller BI value denotes a higher level of branching. It should be noted that this method indicates only the relative degree of branching and not a quantified amount of branching as would be determined using a direct measurement, i.e. NMR.

EXAMPLE

Ethylene, alpha-olefin, vinyl norbornene polymers are synthesized at diene levels varying from 0.3 to 2 weight percent and evaluated in medium voltage electrical compound formulations. A major portion of the compound data and replicate measurements are obtained with ethylene, alpha-olefin, vinyl norbornene having a diene content of 0.8 weight percent. Little benefit is observed in increasing the diene level beyond 1 weight percent, as it is possible to reduce the diene level below 1% and still retain both a high state of cure and substantial levels of branching. Table 1 shows the polymer characteristics of several ethylene, alpha-olefin, non-conjugated diene elastomeric polymers. The ethylene, alpha-olefin, ethylidene norbornene (ENB) polymer from the semi works unit is labeled as Polymer 1. The ethylene, alpha-olefin, vinyl norbornene polymer [synthesized in the pilot unit] is referenced as Polymer 2. Polymer 3 is a commercially available ethylene, propylene, 1,4-hexadiene elastomeric polymer, Nordel(g) 2722 (available from E. I. DuPont). Polymer 4 is a commercially available ethylene, propylene, ethylidene norbornene elastomeric polymer Vistalon® 8731 (available from Exxon Chemical Company). Polymer 5 is a commercially available ethylene, propylene copolymer Vistalon ® 707 (available from Exxon Chemical Company). The ethylene, alpha-olefin, vinyl norbornene polymer from the semi works unit is referenced as Polymer 6. Table 1 shows the polymer characteristics of all the elastomeric polymers used in the compound formulations. Both Polymer 2 and Polymer 6 have higher levels of branching compared to the other polymers. The branching index for Polymer 2 and Polymer 6 is 0.2, while for the comparative examples BI is >0.5. Polymer 5 is a linear copolymer with a BI value of 1.0.

Cure Characteristics

Table 2 shows medium voltage electrical compound formulations containing 45 phr clay (Formulation A) and 60 phr clay (Formulation B) with other additives. The clay, Translink 37, is a calcined surface modified (vinyl modification) Kaolin available from Engelhard. The 60 phr day recipe of Formulation B is referred to as Superohm ® 3728 and is used commercially. All of the compounding is performed either in a 300 cc midget Banbury mixer; or a larger 1600 cc Banbury mixer. The mixing conditions and procedures are shown in Table 3. The compounds discharged from the Banbury mixer were sheeted out in a two roll mill. The peroxide cure was added in the mill to 300 grams of the compound. Table 4 compares the cure characteristics and compound properties of Polymer 1 (Example 1) with Polymer 2 (Example 2) in a 45 phr clay compound using Formulation A. The peroxide used in the recipe of Table 4 is Dieup R, which is a 100% active dicumyl peroxide. $M_H$–$M_L$ is used as a measure of cure state. The 2.6 phr peroxide loading used with Polymer 1 compound is a commonly used level in the industry. The peroxide level in Polymer 2 (VNB) is reduced to 1.6 phi. At this curative level, the compound in Example 2 attains generally the same cure state as Example 1 which has 3 times as much diene in the elastomeric polymer. The cure rate is about 25% higher in Example 2 compared to Example 1. The higher level of branching in Polymer 2 reduces both the tensile strength and elongation as shown in Example 2. Table 5 compares the cure characteristics and physical properties of Polymer 3 (Example 3), Polymer 5 (Example 4) and Polymer 6 (Example 5) in a 45 phr clay compound using Formulation B. The peroxide level is maintained at 6.5 phr in all the formulations. The peroxide used in the compounds of Table 5 is Dicup 40 KE, which is a 40% active dicumyl peroxide supported on Burgess clay. The compound containing Polymer 5 uses an additional co agent Tri allyl cyanurate for vulcanization. The cure rate in the Example 5 formulation with the VNB containing polymer is significantly higher than Example 3 and Example 4 compounds. Example 5 formulation also attains a higher cure state. The tensile strength of Example 3 and Example 5 compounds is similar but higher compared to Example 4 formulation.

Table 6 shows the cure characteristics and physical properties of electrical compounds containing 60 phr clay using Formulation B. The peroxide Dieup 40 KE level is 6.5 phr in all compounds. Both cure rate and cure state in Example 9 formulation containing the VNB elastomeric polymer is higher compared to the other examples. The physical properties are generally similar. FIG. 1 compares the variation in cure rate with peroxide level in 60 phr clay formulations for compounds formulated with Polymer 6, Polymer 3 and Polymer 5 respectively. The compound containing Polymer 5 uses additional coagent Tri allyl cyanurate in a ⅓ phr ratio with active peroxide level. From FIG. 1 it is evident that Polymer 6 formulation cures significantly faster than the comparative compounds. The enhancement in cure rate is about 60%.

Heat Aging Performance

The heat aging performance of Polymer 1 formulation containing 45 phr clay is compared with an equivalent Polymer 2 (VNB) compound as shown in Table 7. The diene level in Polymer 2 (1 weight percent VNB) is significantly lower than the diene level in Polymer 1 (3.3 weight percent ENB). As seen in Example 11 of Table 7, the lower diene content in the ethylene, alpha-olefin, vinyl norbornene elastomeric polymer imparts superior heat aging performance to the electrical compound. Long-term heat aging after 14 days at 150° C. shows that the Polymer 1 compound loses 51% of its unaged tensile strength and 76% of its elongation, while the corresponding property changes for the ethylene, alpha-olefin, vinyl norbornene elastomeric polymer formulation are 16% and 13% respectively.

Figure 2:
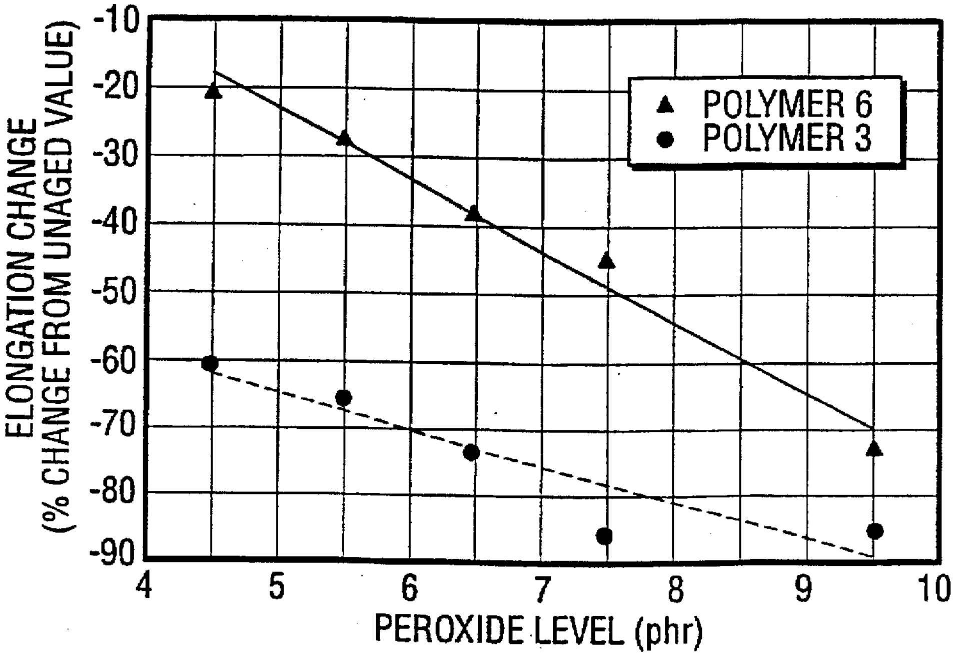
FIG. 2 shows heat aging performance of electrical compounds (60 phr clay) containing varying levels of peroxide in the formulation.

The heat aging performance of Polymer 6 (VNB) compound is compared with control formulations in a 60 phr clay loaded recipe. This data is shown in Table 8. The long term (28 days/150° C.) heat aging performance of Polymer 6 recipe (Example 15) is significantly improved over the other formulations. The data shows that the loss in elongation at break after 28 days heat aging at 150° C. is 35% for Polymer 6 compound, while the reductions are 72% for Polymer 3 compound, 76% for Polymer 4 compound and 59% for Polymer 5 compound respectively. FIG. 2 compares the heat aging (elongation loss from unaged value) data after 28 days at 150 ° C. in formulations containing varying peroxide levels. From FIG. 2 it is evident that formulations with Polymer 6 have superior heat aging characteristics compared to Polymer 3 compounds.

Compound Extrusion Characteristics

Extrusion studies of the electrical compounds are performed in a Haake Rheocord 90 (L/D=20/1) extruder. A screw with a compression ratio of 2/1 (geometry typical for processing rubber compounds) is used in all extrusions. A Garvy die is used for extrudate analysis. The extrusion temperature is maintained at 110° C. The extruder screw speed is varied from 30 to 120 rpm so that extrusion properties could be monitored at varying extrusion rates. Samples are obtained after the torque and the pressure drop equilibrated to a steady value at a constant screw speed.

Figure 3:
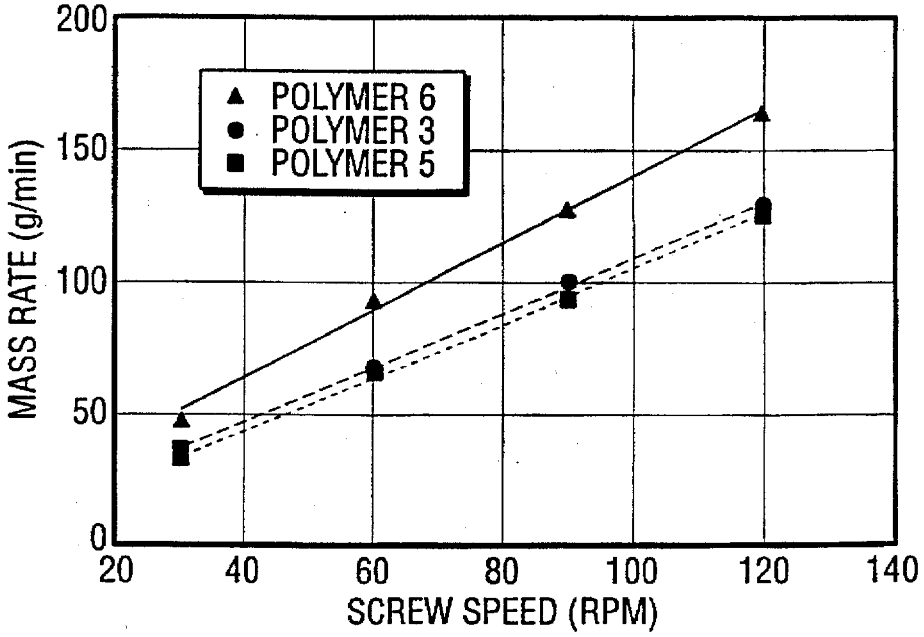
FIG. 3 shows variation in compound mass extrusion rate with extrusion speed in 60 phr clay formulations.

The mass throughput and the surface roughness of the extrudate are measured at different extruder screw speeds. The mass throughput is represented as the weight of the extrudate per unit time. FIG. 3 shows the variation in mass extrusion rate with extruder screw speed for the 60 phr clay electrical formulation. The compound with Polymer 6 has a higher mass throughput at all extrusion speeds compared to Polymer 3 and Polymer 5 formulations. The higher level of branching in Polymer 6 favorably influences the compound rheology to produce a higher mass throughput compared to the less branched polymers.

The surface roughness of the extrudate is measured using a Surfcorn ® 110 B surface gauge (manufactured by Tokyo Seimitsu Company). The Surfcorn ® instrument contains a diamond stylus which moves across the surface of the sample subject to evaluation. This sample can range in hardness from metal or plastic to rubber compounds. The instrument records the surface irregularities over the length (assessment length) traveled by the diamond stylus. This surface roughness is quantified using a combination of two factors:

1. $R_a$(μm), an arithmetic mean representing the departure of the surface profile from a mean line.

Figure 4:
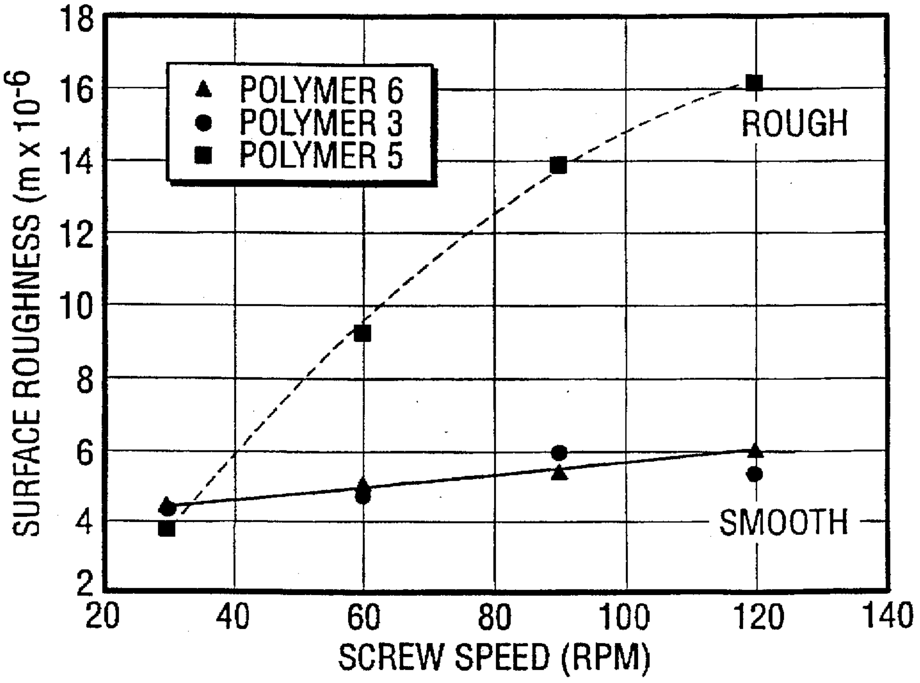
FIG. 4 shows variation in compound surface roughness with extrusion speed in 60 phr clay formulations.

2. $R_t$(μm), the vertical distance between the highest point and the lowest point of the roughness profile within the assessment length. The Roughness Factor (R) is defined as:

$$R(\mu m)=R_a+0.1\ R_t,$$

and incorporates both the $R_a$ and $R_t$ terms. $R_t$ is given a lower weighting to adjust for its magnitude relative to $R_a$. FIG. 4 shows the variation in surface roughness factor (R) with extrusion speed in a 60 phr clay formulation. A lower R value indicates a smoother surface. Both Polymer 3 and Polymer 5 compounds maintain a relatively smooth extrudate surface at all extrusion speeds. The formulation with Polymer 6 progresses to increasingly rough extrudates with increasing extruder speeds.

Electrical Properties

Figure 5:
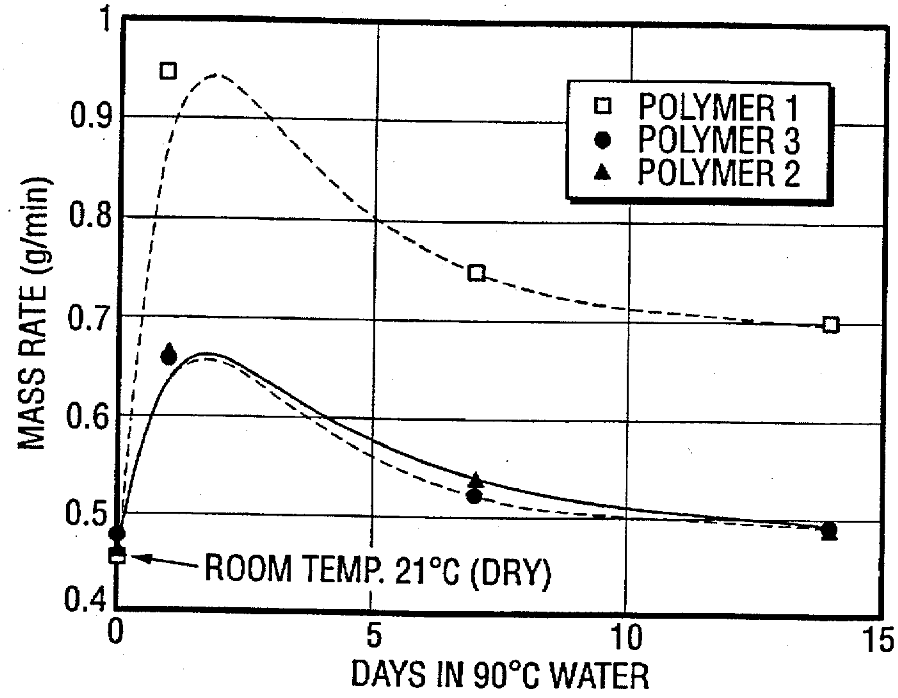
FIG. 5 shows variation in electrical power dissipation factor with time in 45 phr clay formulations.

FIG. 5 compares the electrical performance of Polymer 2 (VNB) with Polymer 1 and Polymer 3 compounds. The formulations contain 45 phr clay. The electrical power factor loss (% dissipation) is measured on dry compounds at room temperature (21° C.) and after lengthy exposure in water at 90° C. A low dissipation factor or low loss is desired for good insulation. The presence of metallic contaminants such as calcium residues prevalent in Polymer 1 increases the electrical power factor loss as shown in FIG. 5.

Table 9 shows wet electrical properties of Polymer 6 (VNB) compound and comparative formulations in a 60 phr clay recipe. The dissipation after 28 days exposure in 90° C. water are lowest for Polymer 6 (0.514%) and Polymer 3 (0.525%) compounds respectively. The absence of calcium residues in these polymers provide superior electrical properties. The dissipation factors are substantially higher in Polymer 4 (0.814%) and Polymer 5 (1.214% after 14 days) formulations owing to the presence of calcium residues in the gum polymer.

Enhancement of Compound Physical Properties

Figure 6:
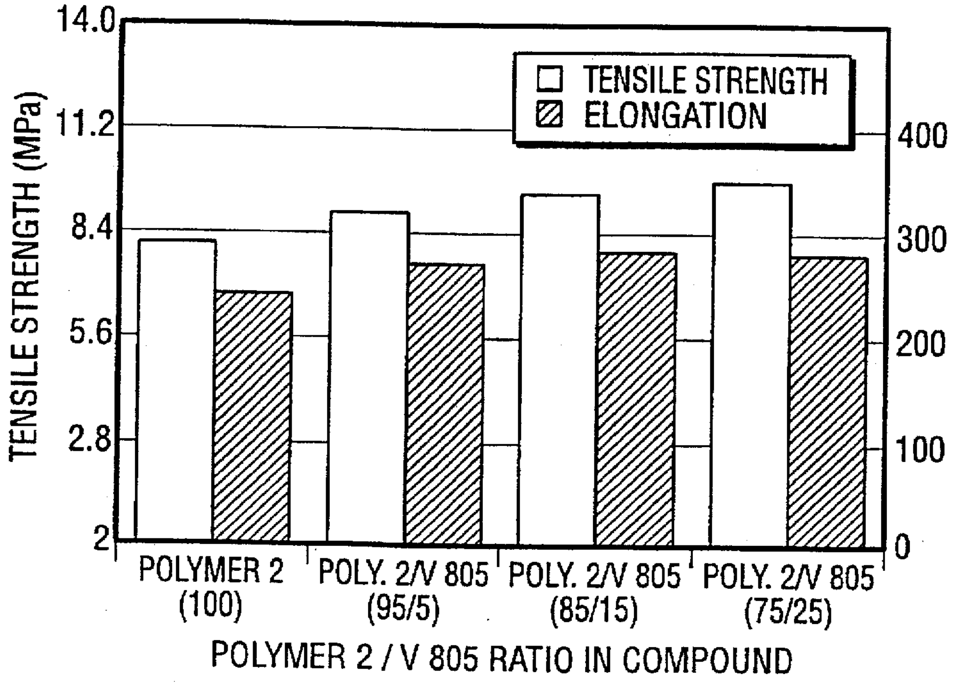
FIG. 6 shows improvements in compound physical properties through blending with a crystalline ethylene propylene copolymer.
Figure 7:
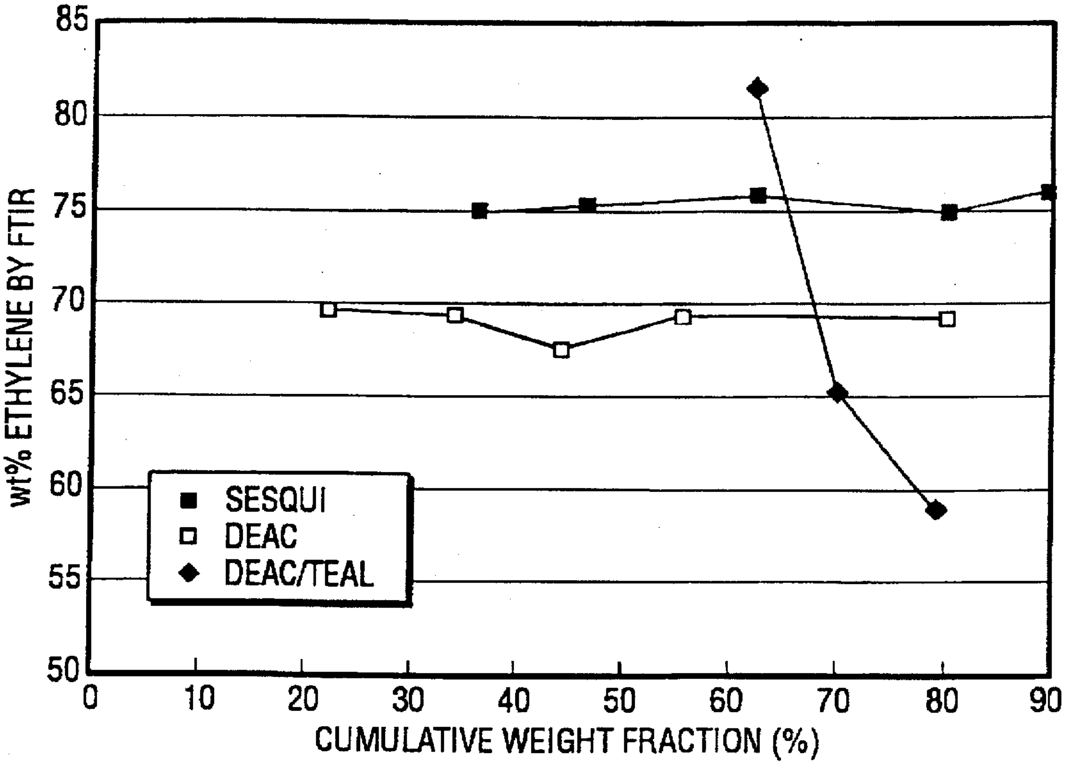

In an attempt to improve the tensile strength of the ethylene, alpha-olefin, vinyl norbornene elastomeric polymer compound; additional compounds containing blends of Polymer 2 with a highly crystalline ethylene propylene copolymer (Vistaion ® 805 from Exxon Chemical Company: Mooney viscosity (1+4) 125° C.=33, ethylene content=79 wt. %) are formulated at varying proportions of the crystalline copolymer. FIG. 6 shows data on tensile strength and elongation from blends of Polymer 2 with Vistalon ® 805 in a 45 phr clay compound. With increasing proportion of Vistalon ® 805, there is enhancement in both tensile strength and elongation. Although a two polymer system is generally not an acceptable alternative for this application, a single polymer which is an equivalent of the two polymers discussed in this example can be synthesized using a parallel reactor technology. In this synthesis, Polymer 2 and Vistalon ® 805 would be synthesized independently in two separate reactors and the solutions containing the polymers would be blended in a tank, to furnish a molecular mixture of the two polymers.

Although the present invention has been described in considerable detail with reference to certain preferred embodiments thereof, other versions are possible. For example, means of forming other vinyl norbornene copolymers and other uses also contemplated. Additionally, while certain ingredients have been exemplified, other ingredients, and/or other inclusion levels are also contemplated. Therefore the spirit and scope of the appended claims should not be limited to the description of the preferred versions contained herein.

TABLE 1

POLYMER CHARACTERISTICS

| POLYMER | ML (1 + 4) 125° C. | Ethylene (wt. %) | Diene Type | Diene (wt. %) | BI* |
|---|---|---|---|---|---|
| Polymer 1 | 35 | 71 | ENB(1) | 3.3 | 0.6 |
| Polymer 2 | 37 | 71 | VNB(2) | 0.95 | 0.2 |
| Polymer 3 | 23 | 74 | HEX(3) | 4.0 | 0.6 |
| Polymer 4 | 29 | 74 | ENB | 3.3 | 0.6 |
| Polymer 5 | 21 | 68 | none | — | 1.0 |
| Polymer 6 | 35 | 76 | VNB | 0.87 | 0.2 |

*Branching Index
(1)ethylidene norbornene
(2)vinyl norbornene
(3)1,4-hexadiene

TABLE 2

MEDIUM VOLTAGE ELECTRICAL COMPOUND FORMULATIONS

| Components | Description | Formulation A (phr) | Formulation B (phr) |
|---|---|---|---|
| Polymer | | 100 | 100 |
| Translink 37 | Clay | 45 | 45–60 |
| Agerite MA | Antioxidant | 1.5 | 1.5 |
| Drimix A 172 | Silane | 1.0 | 1.0 |
| Zinc Oxide | | 5.0 | 5.0 |
| ERD 90 | Red Lead | 5.0 | 5.0 |
| Escorene LD 400 | Low Density Polyethylene | — | 5.0 |
| Paraffin 1236 | Wax | — | 5.0 |
| Curatives | | | |
| Dicup R | Dicumyl peroxide | 1–3 | — |
| Dicup 40 KE | Dicumyl peroxide on clay (40% Active) | — | 4.5–9.5 |

TABLE 3

MIXING PROCEDURE

| Time (minutes) | Rotor Speed (RPM) | Ingredients Addition |
|---|---|---|
| 0 | 85 | Polymer, Agerite |
| 0.5 | 85 | ½ Clay, Zinc Oxide, ERD 90, ½ Drimix, LD 400 |
| 2.0 | 100 | ¼ Clay, ¼ Drimix, ½ Wax |
| 3.0 | 100 | ¼ Clay, ¼ Drimix, ½ Wax |
| 4.0 | 100 | Sweep |
| 5.5 | 100 | Sweep |
| 7.0 | | Dump |

Equipment: 1 'B' Banbury Mixer
Batch Size: 1260 gm

TABLE 4

CURE CHARACTERISTICS AND PHYSICAL PROPERTIES IN FORMULATION A (45 PHR CLAY) COMPOUNDS

| Example | | 1 | 2 |
|---|---|---|---|
| Polymer | | Polymer 1 | Polymer 2 |
| Dicup R (Peroxide) Level | phr | 2.6 | 1.6 |
| Mooney Scorch (MS) - 132° C., min., to 3 point rise | min | 20.2 | 25.0 |
| Compound Mooney Viscosity (ML) 100° C. (1 + 8) minutes | Mooney | 42 | 36 |

TABLE 4-continued

CURE CHARACTERISTICS AND PHYSICAL PROPERTIES IN FORMULATION A (45 PHR CLAY) COMPOUNDS

| Example | | 1 | 2 |
|---|---|---|---|
| Rheometer 200° C., 6 min motor, 3° Arc | | | |
| $M_L$ | dN · m | 10.4 | 8.0 |
| $M_H$ | dN · m | 103.7 | 97.6 |
| $t_{s2}$ | min | 0.6 | 0.6 |
| $t_{c90}$ | min | 1.9 | 1.8 |
| Cure Rate | dN · m/min | 90.2 | 114.7 |
| $M_H$—$M_L$ | dN · m | 93.3 | 89.6 |
| Cure 20 min., 165° C. | | | |
| Hardness | shore A | 73 | 72 |
| 100% Modulus | MPa | 3.3 | 3.0 |
| 300% Modulus | MPa | 8.3 | — |
| Tensile Strength | MPa | 9.4 | 7.7 |
| Elongation | % | 345 | 270 |

TABLE 5

CURE CHARACTERISTICS AND PHYSICAL PROPERTIES IN FORMULATION B (45 PHR CLAY) COMPOUNDS

| Example | | 3 | 4* | 5 |
|---|---|---|---|---|
| Polymer | | Polymer 3 | Polymer 5 | Polymer 6 |
| Dicup 40 KE (Peroxide) Level | phr | 6.5 | 6.5 | 6.5 |
| Mooney Scorch (MS) - 132° C., min. to 3 point rise | min | 21.6 | 12.1 | 11.0 |
| Compound Mooney Viscosity (ML) 100° C. (1 + 8) minutes | Mooney | 33 | 40 | 38 |
| Rheometer 200° C., 6 min motor, 3° Arc | | | | |
| $M_L$ | dN · m | 7.2 | 7.7 | 9.2 |
| $M_H$ | dN · m | 87.6 | 76.5 | 106.1 |
| $t_{s2}$ | min | 0.6 | 0.5 | 0.6 |
| $tc_{90}$ | min | 2.0 | 1.7 | 1.8 |
| Cure Rate | dN · m/min | 80.7 | 85.8 | 114.0 |
| $M_H$—$M_L$ | dN · m | 80.4 | 68.8 | 96.9 |
| Cure 20 min., 165° C. | | | | |
| Hardness | shore A | 86 | 83 | 87 |
| 100% Modulus | MPa | 4.1 | 3.7 | 4.4 |
| 300% Modulus | MPa | 8.8 | 6.7 | 8.0 |
| Tensile Strength | MPa | 10.2 | 7.8 | 9.5 |
| Elongation | % | 364 | 402 | 253 |

*Example 4 contains coagent Tri allyl cyanurate (TAC) at 0.8 phr

TABLE 6

CURE CHARACTERISTICS AND PHYSICAL PROPERTIES IN FORMULATION B (60 PHR CLAY) COMPOUNDS

| Example | | 6 | 7 | 8* | 9 |
|---|---|---|---|---|---|
| Polymer | | Poly. 3 | Poly. 4 | Poly. 5 | Poly. 6 |
| Dicup 40 KE (Peroxide) Level | phr | 6.5 | 6.5 | 6.5 | 6.5 |
| Mooney Scorch (MS) - 132° C., min. to 3 point rise | min | 18.4 | 22.0 | 10.5 | 10.0 |
| Compound Mooney Viscosity (ML) 100° C. (1 + 8) minutes | Mooney | 35 | 37 | 45 | 43 |

TABLE 6-continued

CURE CHARACTERISTICS AND PHYSICAL PROPERTIES IN FORMULATION B (60 PHR CLAY) COMPOUNDS

| Example | | 6 | 7 | 8* | 9 |
|---|---|---|---|---|---|
| Rheometer 200° C., 6 min motor, 3° Arc | | | | | |
| $M_L$ | dN · m | 8.7 | 8.0 | 8.2 | 9.7 |
| $M_H$ | dN · m | 106.5 | 90.0 | 79.4 | 112.2 |
| $t_{s2}$ | min | 0.7 | 0.6 | 0.5 | 0.6 |
| $t_{c90}$ | min | 2.1 | 1.9 | 1.7 | 2.0 |
| Cure Rate | dN · m/min | 96.8 | 87.0 | 86.6 | 142.3 |
| $M_H$—$M_L$ | dN · m | 97.8 | 84.0 | 71.2 | 102.5 |
| Cure 20 min., 165° C. | | | | | |
| Hardness | Shore A | 85 | 88 | 84 | 86 |
| 100% Modulus | MPa | 5.4 | 4.7 | 4.4 | 5.7 |
| 300% Modulus | MPa | 10.9 | 9.0 | 8.7 | 10.0 |
| Tensile Strength | MPa | 11.6 | 10.4 | 9.8 | 11.8 |
| Elongation | % | 335 | 429 | 416 | 255 |

*Example 8 contains coagent Tri allyl cyanurate (TAC) at 0.8 phr

TABLE 7

HEAT AGING PERFORMANCE OF FORMULATION A (45 PHR CLAY) COMPOUNDS

| Example | | 10 | 11 |
|---|---|---|---|
| Polymer | | Polymer 1 | Polymer 2 |
| Dicup R (Peroxide) Level | phr | 2.6 | 1.6 |
| Heat Aging, 7 Days/150° C. | | | |
| Hardness Change | points | 3 | 3 |
| 100% Modulus Change | % | 6 | 8 |
| Tensile Strength Change | % | −2 | 6 |
| Elongation Change | % | −14 | −7 |
| Heat Aging, 14 Days/150° C. | | | |
| Hardness Change | points | 3 | 6 |
| 100% Modulus Change | % | na | −5 |
| Tensile Strength Change | % | −51 | −16 |
| Elongation Change | % | −76 | −13 |

TABLE 8

HEAT AGING PERFORMANCE OF FORMUATION B (60 PHR CLAY) COMPOUNDS

| Example | | 12 | 13 | 14* | 15 |
|---|---|---|---|---|---|
| Polymer | | Polymer 3 | Polymer 4 | Polymer 5 | Polymer 6 |
| Dicup 40 KE (Peroxide) Level | phr | 6.5 | 6.5 | 6.5 | 6.5 |
| Heat Aging, 14 Days/ 150° C. | | | | | |
| Hardness Change | points | −1 | 1 | 1 | 4 |
| Tensile Strength Change | % | −9 | 2 | 11 | 10 |
| Elongation Change | % | −19 | −16 | −9 | 3 |
| Heat Aging, 28 Days/ 150° C. | | | | | |
| Hardness Change | points | 1 | −1 | −1 | 0 |
| Tensile Strength Change | % | −40 | −49 | −24 | −34 |
| Elongation Change | % | −72 | −76 | −59 | −35 |

*Example 14 contains coagent Tri allyl cyanurate (TAC) at 0.8 phr

TABLE 9

WET ELECTRICAL PROPERTIES OF FORMULATION 2 (60 PHR CLAY) COMPOUNDS

| | | % Dissipation Factor | | | | |
|---|---|---|---|---|---|---|
| Example | Polymer | 21° C. Original | 90° C. Water 1 day | 90° C. Water 7 Days | 90° C. Water 14 days | 90° C. Water 28 Days |
| 16 | Polymer 3 | 0.383 | 0.846 | 0.662 | 0.563 | 0.525 |
| 17 | Polymer 4 | 0.319 | 1.138 | 0.928 | 0.833 | 0.814 |
| 18* | Polymer 5 | 0.260 | 1.009 | | 1.214 | |
| 19 | Polymer 6 | 0.339 | 0.798 | 0.599 | 0.522 | 0.514 |

All formulations contain 6.5 phr Dicup 40 KE (peroxide)
*Example 18 contains coagent Tri allyl cyanurate (TAC) at 0.8 phr

We claim:

1. An electrically conductive device comprising:

a) an electrically conductive member including at least one electrically conductive substrate; and b) at least one electrically insulating member substantially surrounding the electrically conductive member, said insulating member including an elastomeric polymer including:

i) ethylene in the range of from about 50 to about 90 mole percent;

ii) alpha-olefin in the range of from about 10 to about 50 mole percent;

iii) vinyl norbornene in the range of from about 0.16 to about 5 mole percent, said mole percents based on the total moles of said elastomeric polymer; and wherein said elastomeric polymer has a branching index less than about 0.5; wherein said elastomeric polymer has a $M_w/M_n$ above about 6; wherein said elastomer polymer has a Mooney viscosity (ML(1+4) @ 125° C.) in the range of from about 10 to about 80; and wherein the total mole % of i), ii) and iii) is 100%.

2. The electrically conductive device of claim 1 wherein said α-olefin is selected from the group consisting of propylene, butene-1, hexene-1, octene-1, and combinations thereof, and wherein said elastomeric polymer has a $M_w/M_n$ greater than about 8.

3. The electrically conductive device of claim 2 wherein said elastomeric polymer is cross-linked with at least one of the group consisting of cross-linking agent and radiation.

4. The electrically conductive device of claim 3 wherein said cross-linking agent is dicumyl peroxide.

5. The electrically conductive device of claim 4 wherein in said conductive member said electrically conductive substrate is selected from the group consisting of aluminum, copper and steel.

6. The electrically conductive device of claim 1, wherein; said elastomeric polymer includes:

i) said ethylene in the range of from about 70 to about 90 mole percent;

ii) said alpha-olefin in the range of from about 10 to about 30 mole percent;

iii) said vinyl norbornene in the range of from about 0.16 to about 1.5 mole percent, said mole percents based on the total moles of said elastomeric polymer; and said elastomeric polymer has a Mooney viscosity ML (1+4) @ 125° C. in the range of from about 15 to about 60; wherein said elastomeric polymer has a branching index up to about 0.4, and wherein said elastomeric polymer has a $M_w/M_n$ above about 10.

7. The electrically conductive device of claim 1, wherein; said elastomeric polymer includes:

i) said ethylene in the range of from about 75 to about 85 mole percent;

ii) said alpha-olefin in the range of from about 15 to about 25 mole percent;

iii) said vinyl norbornene in the range of from about 0.16 to about 1 mole percent, said mole percents based on the total moles of said elastomeric polymer; and said elastomeric polymer has a Mooney viscosity ML (1+4) @ 125° C. in the range of from about 20 to about 40; wherein said elastomeric polymer has a branching index up to about 0.3, and wherein said elastomeric polymer has a $M_w/M_n$ above about 15.

8. The electrically conductive device of claim 1 wherein said device is a medium voltage cable.

9. An electrical cable comprising a) an electrical conductor; and b) an ethylene, alpha-olefin, vinyl norbornene elastomeric polymer, said elastomeric polymer having:

i) said ethylene present in the range of from about 75 to 85 mole percent;

ii) said vinyl norbornene present in the range of from about 0.16 to about 0.4 mole percent;

iii) said alpha olefin present in the range of from about 15 to about 25 mole percent, said mole percents based on the total moles of said elastomeric polymer;

iv) a $M_w/M_n$ greater than about 15;

v) a branching index in the range of from about 0.1 to about 0.3; and vi) a ML(1+4) @ 125° C. in the range of from about 20 to about 40; and wherein the total mole percent of i), ii) and iii) is 100%.

* * * * *